May 4, 1954 W. L. FERGUSON 2,677,321
MECHANICAL COTTON-CHOPPER
Filed Oct. 5, 1950 3 Sheets-Sheet 1
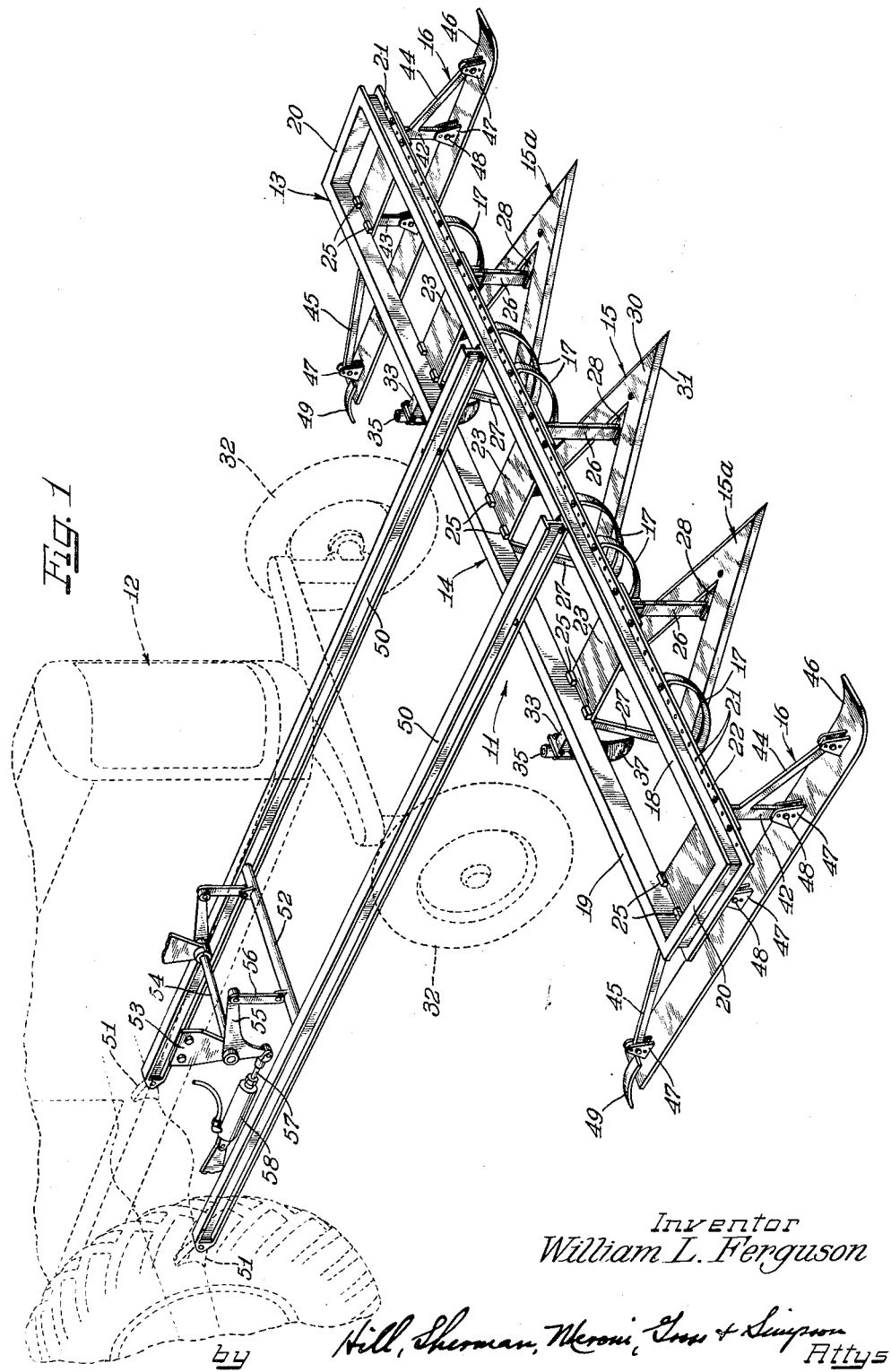
Inventor
William L. Ferguson
by Hill, Sherman, Meroni, Gross & Simpson
Attys May 4, 1954
W. L. FERGUSON
2,677,321
MECHANICAL COTTON-CHOPPER
Filed Oct. 5, 1950
3 Sheets-Sheet 2
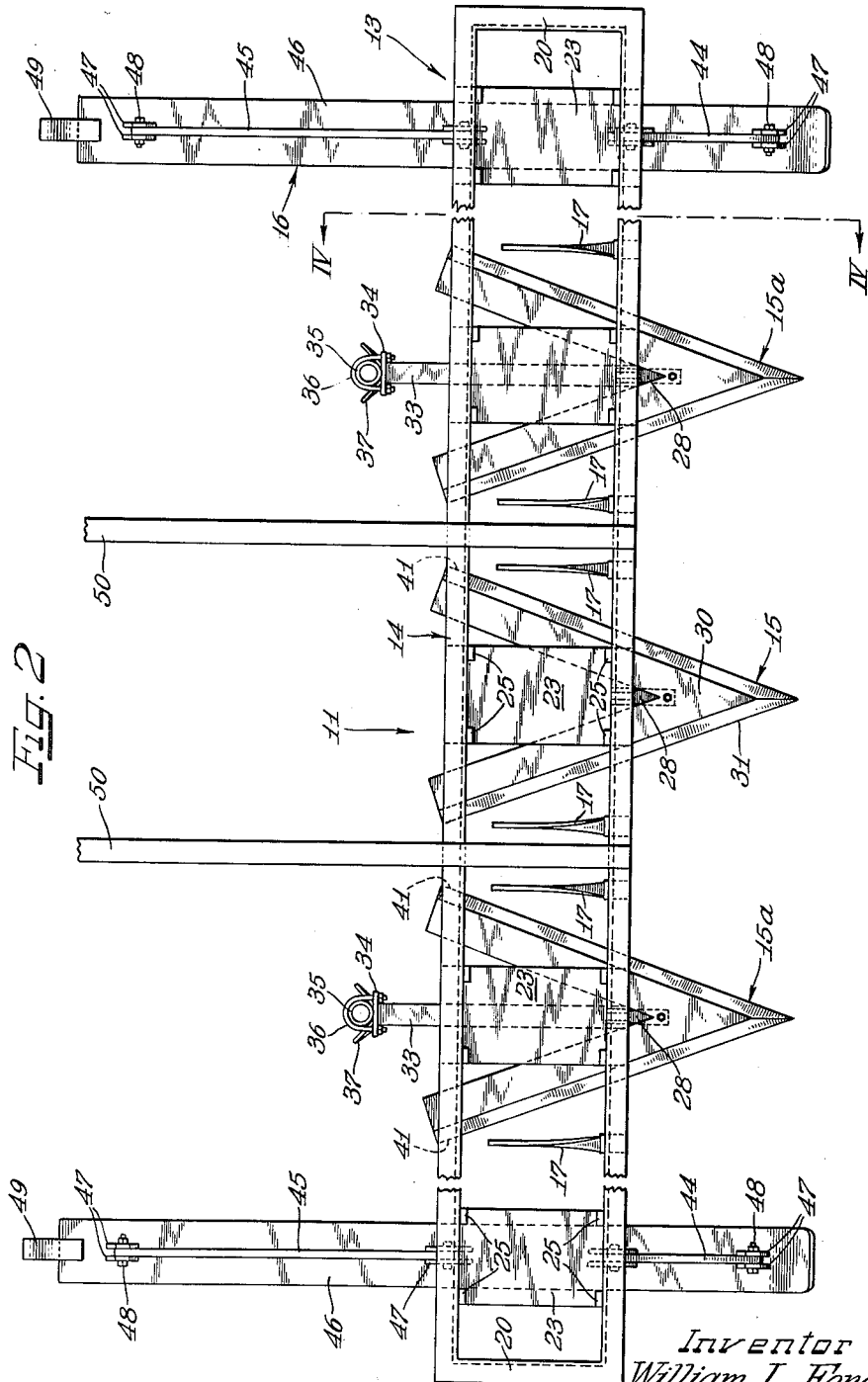

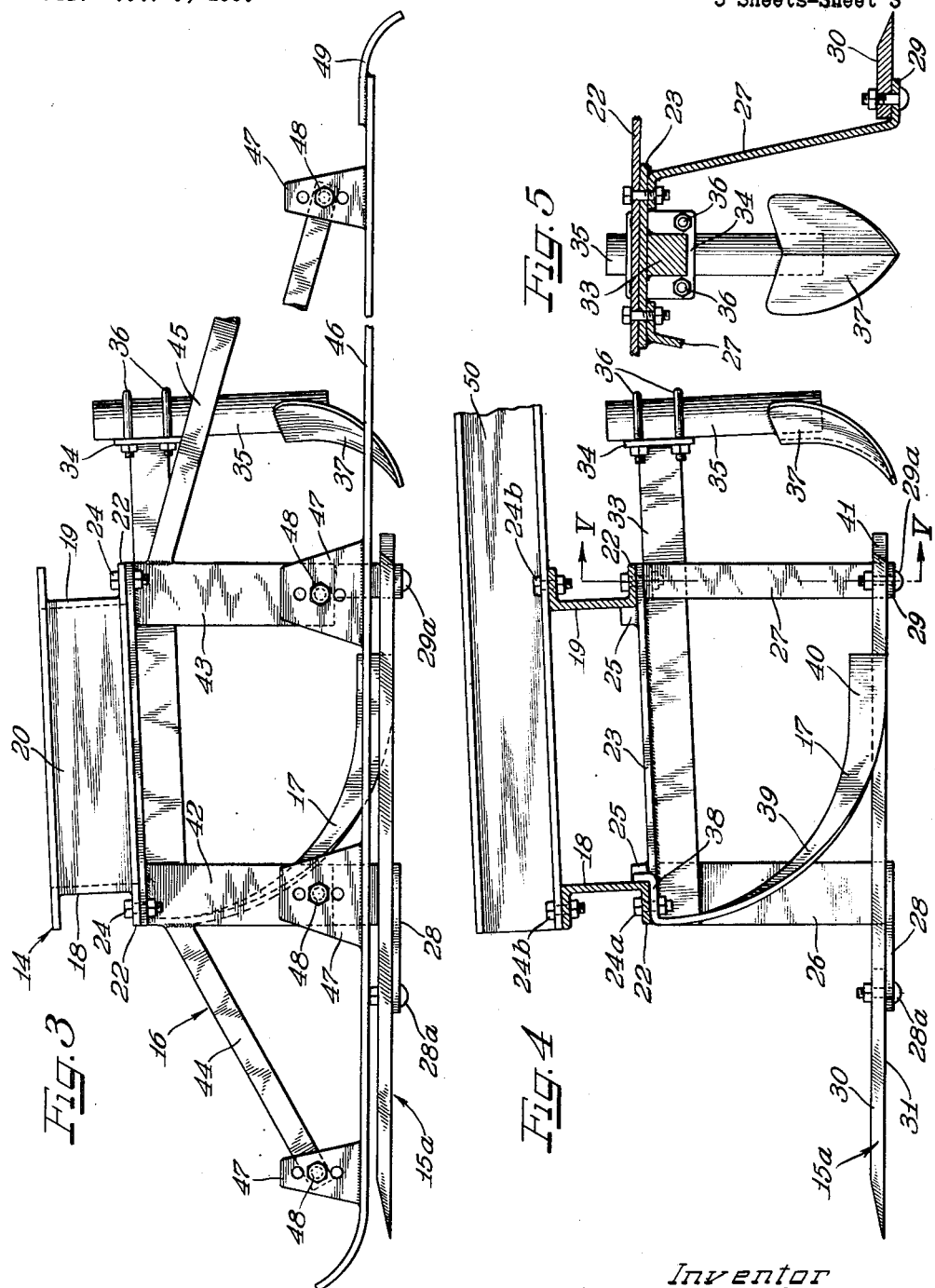

Patented May 4, 1954

2,677,321

UNITED STATES PATENT OFFICE 2,677,321

MECHANICAL COTTON-CHOPPER

William L. Ferguson, Oil City, La.

Application October 5, 1950, Serial No. 188,641

7 Claims. (Cl. 97—23)

This invention relates to agricultural implements and more particularly to a cotton-chopper attachment for tractors.

After a cotton crop has come up and furrows have been formed therein to divide the cotton plants into rows, the crop is customarily thinned by hoeing or chopping the unnecessary plants to form spaced stands of two or more plants. Mechanical cotton-choppers which eliminate laborious hoeing have heretofore comprised a number of blades which are drawn transversely through the furrows to leave hills or stands aligned and spaced apart the width of the blades. To effect as careful and controlled a thinning as may be accomplished by laborious hoeing, it is necessary that the mechanical cotton-chopper be adjustable for a variety of terrains and crops and that it chop cleanly without disturbing the stands.

It is, therefore, an object of this invention to provide an improved mechanical chopper which is readily adapted to a variety of terrains and crop formations and which chops cleanly without disturbing stands of plants.

It is a further object of this invention to provide an inexpensive and lightweight mechanical chopper implement which may be adjustably carried by a tractor for use particularly on small farms.

Yet a further object is to provide a cotton-chopper implement which is lightly but sturdily constructed and which may be adjusted for various depths of cutting or chopping.

A still further object of this invention is to provide a cotton-chopper attachment for tractors which has a plurality of chopper units adjustably spaced to leave stands of various widths.

A specific object of this invention is to provide a mechanical cotton-chopper implement of improved construction having height-gauging means and a plurality of chopper units, each detachably secured to a light but sturdy frame at various spacings therealong.

A more specific object is to provide harrow elements in association with the chopper units to break ground cleanly on either side of the stands to prevent the upsetting of the plants in the stands by the chopper units.

Yet a more specific object is to provide a cotton-chopper attachment for tractors, which has certain chopper units provided with plow elements to form a substantially level path for the tractor wheels and, thereby, to obtain a more uniform chopping action.

Other objects of the invention and the various advantages and characteristics of a preferred embodiment thereof, given by way of example, will be apparent from a consideration of the following detailed description and the accompanying drawings to which reference is made.

In the drawings:

Figure 1 is a perspective view of the cotton-chopper attachment carried by a farm tractor, the tractor being illustrated in dotted lines.

Figure 2 is a top plan view of a cotton-chopper implement.

Figure 3 is a side elevational view of the cotton-chopper implement.

Figure 4 is a side elevational section of the cotton-chopper implement, taken on the line IV—IV of Figure 2.

Figure 5 is a fragmentary sectional view of a chopper unit, taken on the line V—V of Figure 4.

Corresponding and like parts are designated in the drawings, and are referred to in the following description, by the same reference characters.

In Figure 1, a mechanical cotton-chopper attachment, designated as 11, is carried by a farm tractor 12 and includes a cotton-chopper implement 13 and an implement lifting structure to be described hereafter. The implement 13 includes a frame 14 and chopper units 15 and 15a, runner units 16, and harrow elements 17 dependently carried by said frame. To be both light and sturdy, the frame 14 is open-rectangular in form and comprises forward channel beam 18, rear channel beam 19, and side channel beams 20. These four beams may be welded or otherwise secured at their junctions and are preferably positioned with their channels opening outwardly. The forward and rear beams 18 and 19 extend transversely of the tractor 12 and have a series of bolt holes 21 along lower flange portions 22 thereof. For implements larger than that here illustrated, intermediate cross bracing may be provided to strengthen the frame 14.

Each chopper unit 15 includes an attachment plate 23 which fastens to the flange portions 22 of the forward and rear beams 18 and 19 by securing means such as bolts 24. To facilitate the securing of the plates 23 to the beams, guide lugs 25 are welded to the upper faces of said plates to abut upon the front face of the rear beam 19. The attachment plate 23 has welded to the bottom face thereof a vertical forward leg 26 and a pair of divergent rear legs 27. A shoe 28 is welded to the bottom extremity of the forward leg 26 and extends forwardly thereof. The bottom portions of the rear legs 27 are bent upwardly and outwardly to form feet 29 which are spaced slightly further below the frame 13 than are the shoes 28. Detachably secured to the shoe 28 and the feet 29 by bolts 28a and 29a is a planar V-shaped cutting blade 30 having the outward edges thereof beveled downwardly to form cutting edges 31. The blade 30 is positioned with the shoe 28 bolted to the apex thereof, with the forward leg 26 extending through the crotch thereof, and with the remote ends of the blade symmetrically carried beneath the attachment plate 23 by the rear legs 27. The difference in height between the feet 29 and the shoe 28 relative to the frame 14 compensates for the slight forward tilt of the frame, whereby the blade 30 is normally carried in a horizontal plane when in ground-engaging position. The blade may be removed for sharpening or replacement.

The chopper units 15a which are spaced ahead of front wheels 32 of the tractor include a rearwardly extending tool bar 33 welded to the under face of the attachment plate 23 and to the forward leg 26. The bar 33 may be disposed centrally of the plate 23 and slotted to receive the forward leg 26, or it may be displaced to abut a lateral face of the leg 26. To the rear extremity of each tool bar 33 is secured a mounting plate 34 with a standard 35 held thereagainst by means of U-bolts 36 secured thereto. The lower end of the standard 35 carries a plow element 37, such as a light shovel plow, to form a level path for the wheels 32. The tool bars 33 could also be supported by the frame 14 separately from the chopper units 15a, as by securement across the top of the frame, to extend in front of the wheels 32 despite changes in the positions of the chopper units.

The harrow elements 17 are associated in pairs with each of the chopper units 15 and 15a, and are spaced laterally on either side thereof. The harrow elements are formed simply and with strength and resilience from bar stock sufficiently thin to have the cutting properties of a knife. The bar stock is formed with an apertured upper tab 38 bent to engage the beam 18, a twisted middle portion 39 extending downwardly and rearwardly therefrom and a knife portion 40 extending rearwardly therefrom and lying in a vertical plane. The tab 38 is secured by means of a bolt 20a to the flange 22 of the forward beam 18 through a bolt hole 21 therein spaced laterally from the attachment plate 23 a distance sufficient to align the knife portion 40 with trailing edge 41 of the blade 30. The knife portion 40 is, moreover, carried at the same depth below the frame 14 as is the blade 30 to break, but not turn, the clods linearly alongside the swath of ground to be chopped. By this preparation, the harrow elements 17 prevent disruption of the hills or stands of plants which lie between the adjacent blades 30.

The runner units 16 are carried outwardly on the frame from the cutter units 15a and each comprises an attachment plate 23a similar to the attachment plate 23 of the chopper unit, forward and rear legs 42 and 43, braces 44 and 45, and a runner 46. The legs 42 and 43 are welded centrally to the bottom face of the plate 23a, while the braces 44 and 45 are welded to the top of the corresponding legs 42 and 43. To the top face of runner 46 are secured brackets 47 spaced apart to receive the legs and braces. To permit vertical adjustment of the height-gauging runners 46, the brackets 47 are provided with vertically spaced bolt holes 48 which register with single bolt holes in the lower extremities of each of the arms 42 and 43 and braces 44 and 45. These bolt holes 48 are so aligned that the runners 46 may be bolted to the legs and braces to lie in a plane parallel to the plane of the cutting edges 31 of the chopper units 15 and 15a. As in Figure 3, the runners 46 are normally carried at a level above the blades 30, so that the blades will chop below ground and uproot the unwanted plants. To index the successive runs of the tractor transversely to the furrows, markers 49 are secured to the trailing edges of the runners 46.

The entire frame 14 and the units dependent therefrom are carried forwardly of the tractor 12 by attachment arms 50 which are secured by bolts 24b extending through flanges of the forward and rear beams 18 and 19 between adjacent chopper units 15 and 15a. The arms 50 are pivotally supported by rear axle lugs 51 and are joined at their mid-length by a cross member 52. The implement lifting structure includes depending brackets 53 carried on either side of the tractor 12 and pivotally supporting a rock shaft 54 which carries crank arms 55. The free ends of the crank arms 55 connect with legs 56 which are attached to the cross member 52, while the driven ends of the crank arms 55 are secured to piston rods 57 of the hydraulic cylinders 58 carried by the tractor. The lifting mechanism is operated hydraulically in a conventional manner to selectively raise and lower the implement 13, and allows a degree of vertical movement of the implement 13 arising from uneven contours of ground. The attachment arms 50 are bolted to the implement frame 14 to facilitate a quick disassembly of the attachment 11, as for storage purposes.

In operation, the chopper units 15 and 15a are secured to the frame 14 at suitable spacings as, for example, four inches for blades of sixteen-inch width. The harrow knives 17 are then secured to the frame 14 in alignment with the trailing edges 41 of the cutting blades 30. Depending upon the soil to be encountered and upon the depth of furrowing and the like, the depth of cutting of the blades 30 is adjusted by bolting the runners 46 to their supporting legs and braces at the desired level. The plow elements 37 are correspondingly set to prepare a level path for the wheels 32 by vertically adjusting the standards 35 relative to the tool bar 33.

The use of simple structural members and the securing thereof by bolts and by welding conduces to the ready and economical manufacture of my cotton-chopper attachment. The use of bolt connections, moreover, promotes a high degree of flexibility in the mounting of the various units, permitting both lateral and vertical adjustments thereof. The provision of vertically adjustable runners and of harrow elements in association with the cutting blades makes possible a clean and controlled chopping of the unwanted plants, thereby leaving sound and evenly spaced stands or hills.

For high production farming, the frame could be extended laterally and additional units added.

While I have resorted to a detailed description of a structural embodiment of my invention, it is to be understood that any alterations or variations might readily be made within the spirit of this invention as set forth and defined in the appended claims.

I claim as my invention:

1. In a cotton-chopper implement, the combination comprising a frame, horizontal attachment plates detachably secured to the frame and carrying spaced-apart chopper units supported dependently therefrom, said units having fixed and aligned V-shaped blades lying in a single substantially horizontal plane, and harrow units carried dependently by said frame and spaced on either side of each of said chopper units to break the ground to the depth of said blades.

2. A cotton-chopper implement, comprising a frame, spaced-apart chopper units, each including an attachment plate, forward and rear legs secured dependently thereto, and a V-shaped cutting blade spaced below said plate and having the apex thereof secured to said forward leg and the extremities thereof secured to said rear legs, means for securing said attachment plates to said frame at spaced positions therealong, and means for angularly raising and lowering said frame, said rear legs having a vertical length slightly greater than the vertical length of said forward leg whereby said cutting blade is supported in a substantially horizontal plane when said frame is in its lower position.

3. A cotton-chopper implement comprising a frame, a plurality of attachment plates secured thereto at spaced intervals, height-gauging runners carried by a first set of plates, cutting blades carried by a second set of said plates in a horizontal plane and disposed angularly relative to said runners to cut on a bias, said cutter blades lying in a plane substantially parallel to and below said height-gauging runners, and means for securing said plates at successive positions along said frame.

4. A chopper unit for a cotton-chopper implement, comprising an attachment plate, a V-shaped cutting blade spaced below and substantially parallel to said plate, a forward leg secured to said plate and extending downwardly through the crotch of said blade, a member secured to the apex of said blade and extending rearwardly beneath said blade to secure the same to said forward leg, rear legs secured to said plate and to the remote ends of said blade, and a tool bar secured to the bottom of said attachment plate and extending rearwardly thereof.

5. In a cotton-chopper implement, the combination comprising an open rectangular frame, forward and rear beams of said frame having a series of bolt holes spaced therealong, chopper units each including an attachment plate bolted to said beams, a forward leg and divergent rear legs dependently secured to said plate, and a planar V-shaped blade detachably secured to said legs and spaced beneath said plate, a harrow knife on either side of each of said chopper units, said knife including a tab formed to engage said forward beam and bolted thereto and a straight knife portion extending rearwardly toward the trailing edge of said chopper blade and on a level therewith to break clods, and runner units including an attachment plate bolted to said beams, a forward and a rear leg dependently secured to said runner attachment plate, a height-gauging runner, brackets carried by said runner to attach the same to said runner legs at vertically adjustable positions, and markers carried by said runners, said chopper and runner units being attachable to said frame at spacings determined by said bolt holes.

6. In a cotton-chopper implement, the combination comprising a supporting frame, chopper units each including an attachment plate secured to said frame, a forward leg and rear legs dependently secured to said plates, and a planar V-shaped chopper blade secured to said legs and spaced beneath said plate, a harrow knife on either side of each of said chopper units, said knife including a straight knife portion extending rearwardly toward the trailing edge of said chopper blade and level therewith, a runner unit including an attachment plate secured to said frame, a forward and a rear leg dependently secured to said runner attachment plate, a height gauging runner, and brackets carried by said runners to attach the same to said runner legs.

7. In a cotton-chopper implement, the combination comprising a supporting frame, chopper units each including an attachment plate secured to said frame, a forward leg and rear legs dependently secured to said plates, and a planar V-shaped chopper blade detachably secured to said legs and spaced beneath said plate, a harrow knife on either side of each of said chopper units, said knife including a straight knife portion extending rearwardly toward the trailing edge of said chopper blade and level therewith, a runner unit including an attachment plate detachably secured to said frame, a forward and a rear leg dependently secured to said runner attachment plate, a height gauging runner, and brackets carried by said runners to attach the same to said runner legs in vertically adjustable positions.

References Cited in the file of this patent

UNITED STATES PATENTS

| Number | Name | Date |
|---|---|---|
| 476,628 | Gay | June 7, 1892 |
| 640,862 | Billingsley | Jan. 9, 1900 |
| 652,513 | Friend | June 26, 1900 |
| 802,137 | Butler | Oct. 17, 1905 |
| 1,446,530 | Wicks | Feb. 27, 1923 |
| 1,527,327 | Patterson | Feb. 24, 1925 |
| 1,538,724 | Mills | May 19, 1925 |
| 1,642,277 | Turner | Sept. 13, 1927 |
| 1,827,237 | Jones | Oct. 13, 1931 |
| 2,150,665 | Tuft | Mar. 14, 1939 |
| 2,171,830 | Hayes | Sept. 5, 1939 |
| 2,322,115 | Cox et al. | June 15, 1943 |
| 2,332,616 | Tuft | Oct. 26, 1943 |

OTHER REFERENCES

Cross Blocking Sugar Beets by Machine, U. S. Dept. of Agriculture Leaflet No. 97 of August 1933.